United States Patent [19]

Peters et al.

[11] Patent Number: 5,128,650

[45] Date of Patent: * Jul. 7, 1992

[54] AUTOMOTIVE BURGLAR ALARM THAT RECYCLES AFTER ITS INITIAL ALARM PRODUCTION

[75] Inventors: Richard G. Peters, Larchmont, N.Y.; Paul F. Wyar, Mt. Airy, Md.

[73] Assignee: Ever-gard vehicle Security Systems, Inc., Larchmont, N.Y.

[*] Notice: The portion of the term of this patent subsequent to Mar. 26, 2008 has been disclaimed.

[21] Appl. No.: 639,088

[22] Filed: Jan. 9, 1991

Related U.S. Application Data

[63] Continuation of Ser. No. 319,764, Mar. 6, 1989, Pat. No. 5,003,287.

[51] Int. Cl.⁵ ............................................. B60R 25/10
[52] U.S. Cl. .................................. 340/428; 180/287; 307/10.2; 340/426
[58] Field of Search ............... 340/428, 426, 425.5, 340/430, 661; 180/287; 307/10.2, 10.3

[56] References Cited

U.S. PATENT DOCUMENTS

| | | | |
|---|---|---|---|
| 3,706,966 | 12/1972 | So et al. | 340/428 |
| 3,831,141 | 8/1974 | Bowman | 340/428 |
| 3,891,967 | 6/1975 | Betts | 340/428 |
| 3,930,226 | 12/1975 | Plumberg | 340/430 |
| 3,956,732 | 5/1976 | Teich | 340/430 |
| 4,205,300 | 5/1980 | Ho et al. | 340/430 |
| 4,539,548 | 9/1985 | Crites | 340/428 |
| 5,003,287 | 3/1991 | Peters et al. | 340/426 |

Primary Examiner—Jin F. Ng
Assistant Examiner—Brent A. Swarthout
Attorney, Agent, or Firm—Cushman, Darby & Cushman

[57] ABSTRACT

An alarm system for an automotive vehicle including direct coupled input connections which provide a voltage proportional to the amount of current interchanged between, the battery and the electrical system of the vehicle. An arming circuit is responsive to the voltage and arms the burglar alarm only when less than a predetermined current is interchanged between the battery and the electrical system. An alarm circuit produces an alarm when the alarm system is armed and more than a predetermined amount of current is drawn from the battery.

12 Claims, 3 Drawing Sheets

AUTOMOTIVE BURGLAR ALARM THAT RECYCLES AFTER ITS INITIAL ALARM PRODUCTION

This is a continuation of application Ser. No. 07/319,764, filed Mar. 6, 1989, and, now U.S. Pat. No. 5,003,287.

FIELD OF THE INVENTION

This invention relates to burglar alarms for automotive vehicles. More specifically, it relates to so called "passive systems" which automatically arm to detect unauthorized entry to a vehicle and automatically disarm, and in particular to those systems which operate by using current sensing.

BACKGROUND ART

Many prior art automotive alarm systems detect unauthorized entry into the vehicle. In order to detect such entry, these alarm systems require that each point of entry (hood, trunk, door) have associated therewith a switch (including in some cases a light activated by the switch) which would cause current to be drawn from the battery when the point of entry was accessed. Systems of this type have several disadvantages.

The most serious disadvantage of such systems is the large cost of installation. It is necessary to run wires from the enclosure containing the alarm system to a relatively large number of points throughout the vehicle. Installation costs may in many cases far exceed the cost of the electronic circuitry of the alarm system itself.

A further disadvantage of such voltage sensing systems is that with many car batteries in common use, the voltage may not remain constant For example, normal chemical activity within the battery which causes bubbling of the electrolyte may cause the battery voltage to change. This may generate false alarms. Further, the absolute value of the battery voltage cannot be used as an alarm criteria because the battery voltage may change from time to time or from vehicle to vehicle.

There are other automobile burglar alarm systems which sense current drawn from the battery. Generally this is done by using an inductive loop. However, such loops can respond only to changes in current, and not to the absolute value of the current being drawn. Thus, any significant change in current drawn by an accessory can trigger a false alarm. If the threshold for triggering is set high enough so that such false alarms are avoided, there is a significant probability of missing an event which should in fact trigger an alarm.

Another disadvantage of systems which use current loop detection is that arming may occur even though current is being drawn from the battery due to, for example, a door being open or a radio being on. Since only changes in current (and not steady state current conditions) are monitored, it is not possible for such systems to differentiate between a steady state current and zero current condition.

U.S. Pat. No. 4,553,127 to Issa discloses a control circuit disposed in a battery casing and connected in series with the battery so as to limit the amount of current supplied to the vehicle to only that necessary to operate accessories, unless the operation of the vehicle is authorized. A current sensor senses the level of current passing through the control circuit.

U.S. Pat. No. 3,706,966 to So et al. discloses a system where the onset of battery current is utilized to produce a voltage pulse which is employed to trigger a silicon controlled rectifier (SCR). Two of the leads to the SCR may be connected to the negative battery cable between the negative battery and ground. The apparatus of So et al. requires that when the motorist parks and locks the automobile he must close a switch to arm the burglar alarm system.

DISCLOSURE OF THE INVENTION

It is an object of the invention to provide an automotive alarm system directly responsive to the interchange of current between the automobile and the automobile battery.

It is a further object of the invention to provide an automotive burglar alarm system which is direct current coupled to the automotive electrical system and can measure the battery current.

In accordance with the invention, a burglar alarm of an automotive vehicle having an electrical system including a battery, battery cables, at least one electrical device for drawing current from the battery, a switch for controlling current flow from the battery to the device and a charging means for supplying charging current to the battery, comprises a direct current coupled input means for providing a signal indicative of the amount of current interchanged between the battery and the electrical system of the automobile; an arming means responsive to the signal for arming said burglar alarm only when less than a first predetermined current is interchanged between the battery and the electrical system; and an alarm means for producing an alarm when the alarm is armed and more than a second predetermined amount of current is drawn from said battery. The arming means includes at least one voltage comparator and a reference voltage means for supplying a reference voltage for the comparator. The comparator provides an arming output to the arming means only when the voltage is lower than the reference voltage.

The direct current coupled input means comprises a pair of input leads. Each lead is for connection to one of two spaced apart points of the electrical system. The points are selected to produce a detectable voltage between the input leads when current is drawn from the battery by the electrical device.

One of the pair of input leads may be adapted for connection to a first point associated with the first position along one of the battery cables and the other of the pair of input leads may be adapted for connection to a second point associated with a second position along the battery cable.

BRIEF DESCRIPTION OF THE DRAWINGS

Further objects, features and advantages of the invention will become apparent upon consideration of the following detailed description in conjunction with the drawings, in which.

DETAILED DESCRIPTION OF THE PREFERRED EMBODIMENTS

Figure 1:
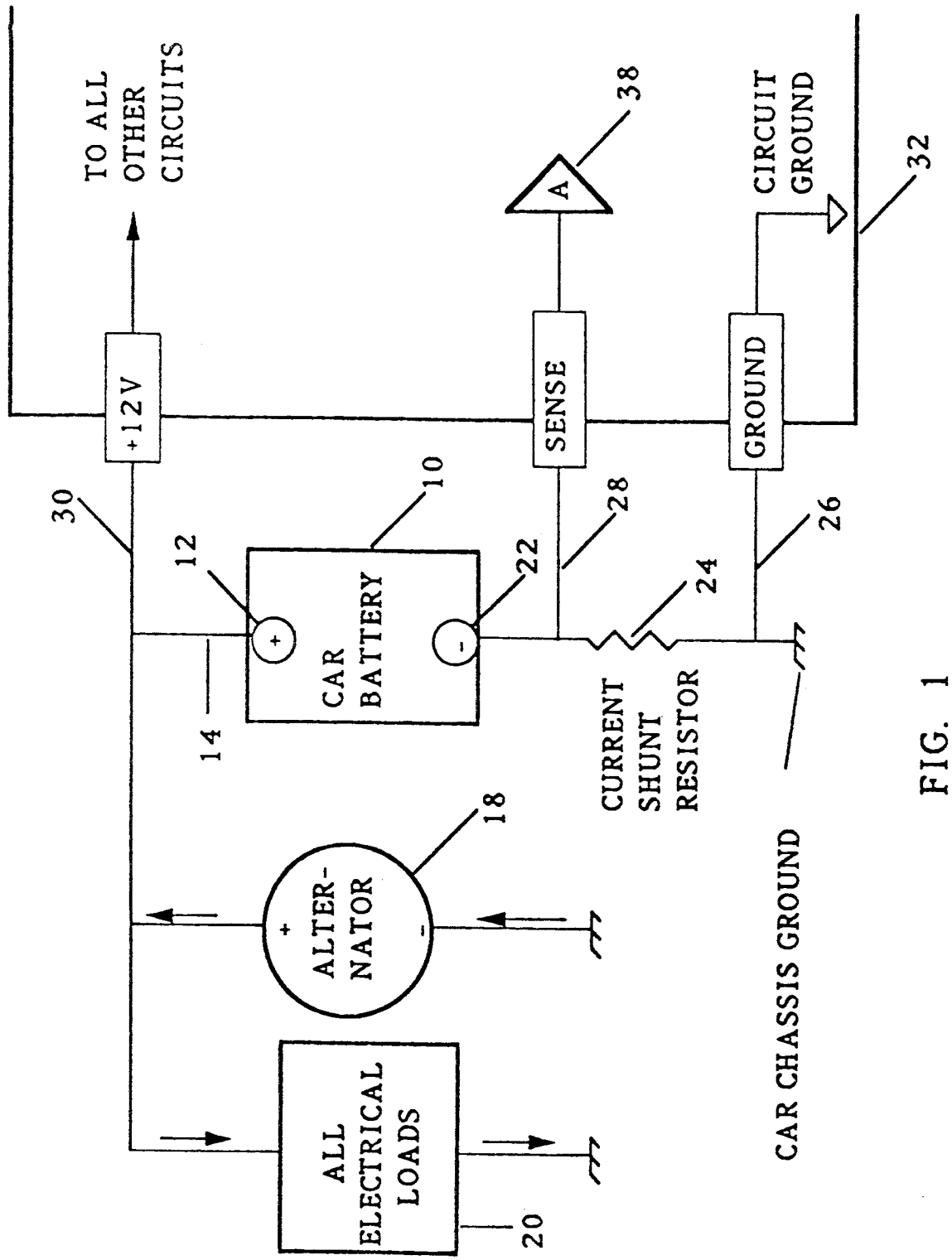
FIG. 1 is a schematic diagram of the manner in which the alarm system of the present invention is connected to the electrical system of the automobile.

FIG. 1 illustrates a simplified schematic diagram of the electrical system of an automotive vehicle. As is well known, a car battery 10 contains the energy for starting the vehicle. The positive terminal 12 of battery 10 is connected through an appropriate cable 14 which connects the battery 10 to the alternator 18 and to other electrical loads represented by block 20. These loads include the engine ignition system, accessories, lights, etc. most of which have their own switches so that the driver can exercise control over their operation. The alternator and the electrical loads are also connected to ground.

The negative terminal 22 of battery 10 is connected through a cable 24 to the car chassis ground. Cable 24 serves as a shunt resistor in the sense that whenever current is drawn from or charged to the battery, a voltage is created across cable 24. It is this voltage drop which provides the basic input signal to the circuitry illustrated in FIG. 2.

A major advantage of the apparatus according to the invention is that in the most simple case, only three electrical connections to the electrical system of the vehicle are necessary. The first is a ground connection lead 26 which connects the circuit ground to the car chassis ground. The second connection is a sense input along line 28 to the negative terminal of the battery to pick up the voltage drop across battery cable 24. Finally, a power lead 30 serves to connect the circuitry to the positive battery terminal 12 so that the circuitry will have operating power.

Figure 2:
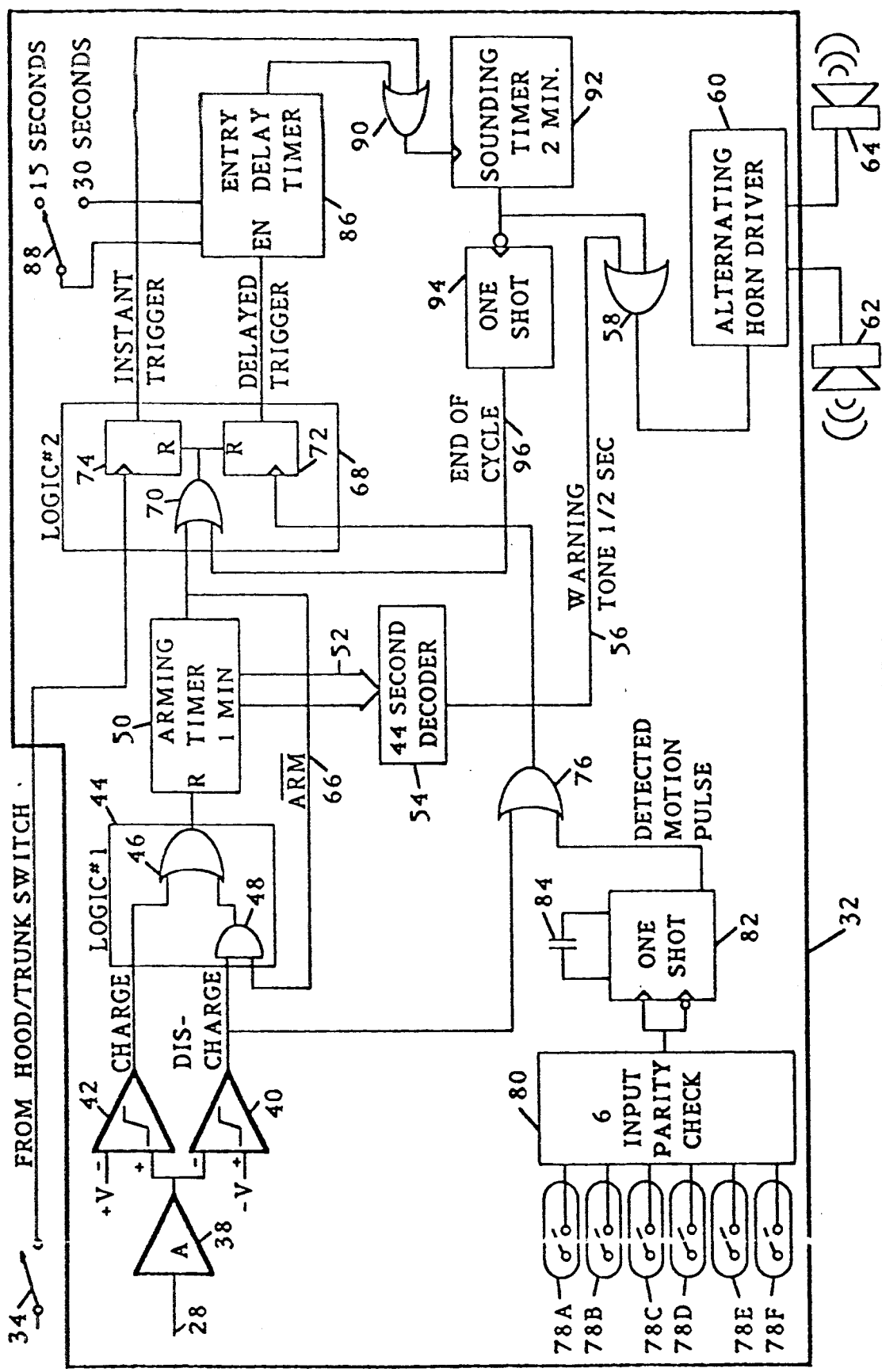
FIG. 2 is a block diagram of the circuitry of the alarm system including its interconnection to various components in the automobile.

Referring to FIG. 2, as long as the circuitry of the alarm system (and in particular, the enclosure 32 containing the circuitry) is mounted under the hood of the vehicle, the three electrical connections are easily made without running any wires between various compartments in the automobile. In other words, it is only necessary to connect to both sides of the battery and chassis ground and all connections are complete. Of course, to prevent unauthorized access to the engine compartment, it is appropriate to include a hood switch 34 which is activated when the hood is opened. However, the wire 36 which connects the hood switch to the circuitry of FIG. 2 will also be contained within the engine compartment. Alternatively, this wiring may not be necessary if the vehicle already contains a hood light which automatically goes on when the hood is opened. Such an arrangement, or a corresponding arrangement in the trunk, will draw current from the battery and trigger the alarm at appropriate times as more fully described below.

The chassis ground and positive voltage connections are not shown in FIG. 2. However, the primary signal input to the system is conducted along sense line 28. Line 28 is connected to the positive input terminal of an operational amplifier 38 such as a type Op 77 manufactured by Advanced Micro Devices. External components (not shown) place amplifier 38 in a relatively high gain configuration (typical gain 6,800) to properly amplify the voltages produced across cable 24, when there is an interchange of current between the car battery 10 and the electrical system of the automobile.

The output of amplifier 38 is connected to the positive input of a first voltage comparator 42 and the negative input of a second voltage comparator 40. The positive input of voltage comparator 40 is connected to a reference voltage source (not shown) which is negative with respect to chassis ground. Thus, when there is a significant current discharge from the battery (for example, greater than one fourth ampere) the negative input to comparator 40 becomes more negative than the positive input and comparator 40 changes state producing a transition from a logic low to a logic high at its output.

The negative input of voltage comparator 42 is connected to a positive reference voltage source (not shown). When the sense line 28 becomes more positive than the positive reference voltage indicating that significant charging of the battery is occurring, the output of comparator 42 switches from a logic low to a logic high state.

The output of comparator 40 and the output of comparator 42 are connected to the inputs of a first logic circuit block 44 which contains an OR gate 46 and an AND gate 48.

The output of comparator 42 is connected to a first input of OR gate 46. The output of comparator 40 is connected to a first input of AND gate 48. The output of AND gate 48 is connected to the second input of OR gate 46. The output of OR gate 46 is connected to the reset input of an arming timer 50.

As long as the reset input is kept at a logic high voltage level, arming timer 50 does not begin an arming cycle. However, as soon as the input drops to a logic zero level, pulses from an internal clock (not shown) are accumulated within arming timer 50. The bit outputs of timer 50 are supplied by a bus 52 to a decoder 54. When the count in the timer corresponds to 44 seconds after the beginning of the arming cycle, as initiated by a drop in voltage at the reset input to arming timer 50, a one-half second pulse is supplied, on line 56, by decoder 54. When this pulse passes through an OR gate 58 to a horn driver 60, it causes horns 62 and 64 to be activated for one-half second, thereby providing a warning to the driver that the system is about to be armed. Sixteen seconds later, at the end of the one minute interval measured by arming timer 50, the output of arming timer 50, on lead 66, undergoes a transition from a high logic level to a low logic level. This signal is also supplied to an input of AND gate 48. Thus, after arming has occurred, any change in the state of discharge comparator 40 is not coupled through AND gate 48 and OR gate 46. This prevents a discharge resulting from an unauthorized entry into the vehicle from resetting arming timer 50. However, an engine start will cause comparator 42 to provide a logic high signal output due to charging of battery 10, thus resetting arming timer 50, and preventing an alarm from being sounded, as described below. Thus, an engine start disarms the circuit.

The output of arming timer 50 on line 66 is also coupled into a second logic block 68. Logic block 68 includes an OR gate 70, a first flip-flop 72 and a second flip-flop 74.

Line 66 is connected to a first input of OR gate 70. The output of OR gate 70 is connected to the reset inputs of flip-flops 72 and 74. Thus, when the system is not armed, flip-flop 72 and flip-flop 74 are held raset.

The output of discharge comparator 40 is connected to a first input of an OR gate 76. The output of OR gate 76 is connected to the set input of flip-flop 72. Thus, once the system is armed, any discharge of current which causes a sufficient drop across battery cable 24 to change the state of discharge comparator 40 produces an output which is supplied to the set input of flip-flop 72.

Also located on the circuit board in enclosure 32 are six mercury level sensors 78A to 78F. These switches change their condition of being open or closed depending upon the orientation of the switch with respect to the vertical. One terminal of each of these switches is connected to a six input parity check block 80. The output of parity check block 80 is connected to both inputs of a monostable multivibrator or one-shot 82. As a result of this input arrangement, one-shot 82 provides a short output pulse whenever there is a positive or a negative transition in the output of parity check block 80. The length of this output pulse is determined by the size of a capacitor 84. When the vehicle is parked, certain of level switches 78A to 78F are closed and certain other ones are open, depending upon the slope of the ground on which the vehicle is parked. As long as the state of the switches remains the same there is no change in the output of parity check block 80. However, if the tilt of the vehicle is changed so that the state of any one of level sensor switches 78A to 78F is changed, an output is provided by parity check block 80. This would occur, for example, if someone attempted to jack up the vehicle so as to attempt to steal the tires or the entire vehicle. In this event, OR gate 76 conducts a detected motion pulse to the set input of flip-flop 72.

Once flip-flop 72 is reset by a logic high level on line 66, either a discharge current above the threshold level needed to trigger threshold comparator 40, or an output generated by a change in the state of one of level sensors 78A to 78E, will set flip-flop 72. When this occurs, the output of flip-flop 72, which is provided to the enable input of an entry delay timer 86, causes entry delay timer 86 to begin an entry delay interval. A switch 88 associated with timer 86 provides a fifteen second delay until an output is produced by timer 86 if it is open, or a 10 second delay if it is closed. Switch 88 is set for the preference of the driver of the vehicle.

The output of timer 86 is provided to a first input of an OR gate 90. The output of OR gate 90 is provided to the enable input of a sounding timer 92 which, once enabled, provides a two minute pulse to a second input of OR gate 58. OR gate 58, due to the action of the two minute input pulse from sounding timer 92, sounds horns 62 and 64 for a period of two minutes if an unauthorized motion or entry to the vehicle has occurred. However, if entry to the vehicle is authorized and the engine is started within the 15 second or 30 second time interval as selected by switch 88, then charge comparator 42 is switched to provide a positive logic output, which resets arming timer 50 and flip-flop 72. If the output of flip-flop 72 drops to a zero logic level before timeout of entry delay timer 86, then no output pulse is provided by timer 86 and no alarm is sounded. Further, timer 86 is reset to zero.

When sounding timer 92 is activated, its output is also supplied to an end of cycle monostable multivibrator or one-shot 94. The trailing edge of the two minute output pulse of timer 92 triggers one-shot 94, thus temporarily providing a logic high signal at the output of one-shot 94. This pulse is provided to a second input of OR gate 70 on end of cycle line 96, thus resetting flip-flops 72 and 74. The alarm signal thus sounds for two minutes, unless the discharge still exists, in which case flip-flop 72 is again set, and the cycle is repeated.

If unauthorized entry to the engine compartment (or trunk) occurs, line 36 goes to a logic high level and sets flip-flop 74. The output of flip-flop 74 is directly connected to a second input of OR gate 90. This instantly activates sounding timer 92 and the alarm is sounded for two minutes until reset due to the action of one shot 94, as described above.

Figure 3:
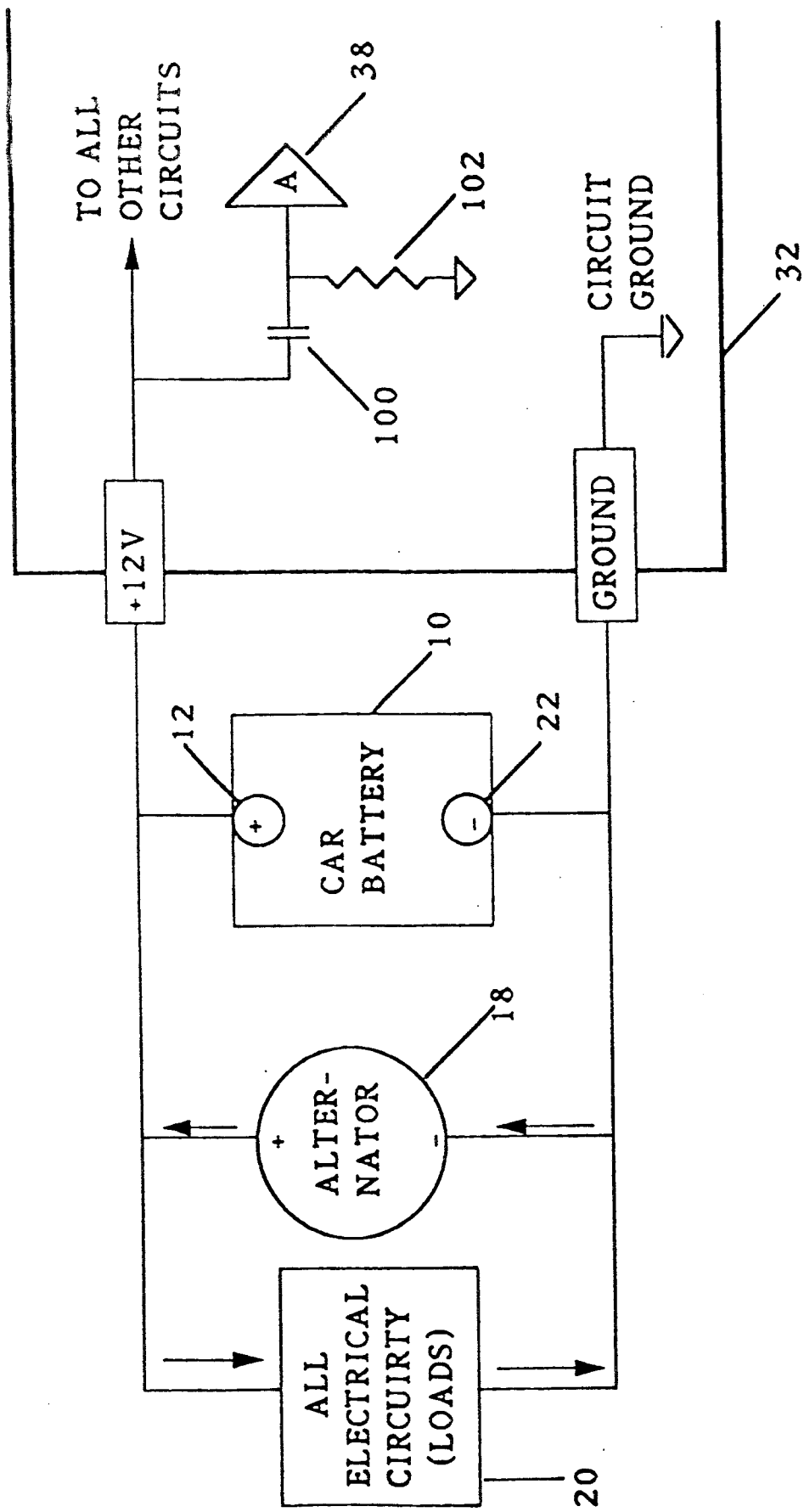
FIG. 3 is an alternative, voltage sensing arrangement for the connection to the circuitry shown in FIG. 2.

Although it is not as advantageous as the arrangement illustrated in FIG. 1, the circuit of FIG. 2 can also be used with the arrangement of FIG. 3 to sense changes in battery voltage. In this case, only two connections are required. One is to the negative terminal 22 of the battery and the other to the positive terminal 12. The connection to terminal 12 serves two purposes. First, power to operate the circuit of FIG. 2 is provided. In addition, this connection serves as a sense line.

The lead from the positive terminal of the battery is connected to one end of a capacitor 100. The other end of capacitor 100 is connected to the input of amplifier 38 and to one end of a resistor 102. The other end of resistor 102 is connected to circuit ground. Capacitor 100 and resistor 102 serve as a differentiator circuit. An output is provided only when the voltage of car battery 10 changes. If the battery is relatively stable, and the thresholds for discharge comparator 40 and charge comparator 42 are properly set, successful sensing of alarm conditions will occur, without activation by changes in battery voltage not due to unauthorized entry.

Although the invention has been described with respect to particular embodiments it is to be understood that these embodiments are merely illustrative of the application of the principles of the invention. Numerous modifications may be made therein and other arrangements may be devised without departing from the spirit and scope of the invention.

We claim:

1. A burglar alarm for an automotive vehicle having an electrical system including a battery, battery cables, at least one electrical device for drawing current from the battery, and a switch for controlling current flow from the battery to said device, said burglar alarm comprising:
   input means for sensing an amount of current drawn from and charged to said battery and producing a signal indicative thereof;
   arming means, responsive to said signal, for automatically arming said burglar alarm only when said current changes to less than a predetermined amount;
   alarm means for producing an alarm indication when said burglar alarm is armed and more than a predetermined current is drawn from said battery, and for maintaining said alarm indication; and
   means for resetting said burglar alarm a predetermined time after said indication, and for causing said alarm indication to recur if more than said predetermined current continues to be drawn from said battery.

2. A burglar alarm as in claim 1, wherein said alarm indication recurs only if said arming means has not reset due to said charge to said battery being less than said predetermined amount.

3. A burglar alarm as in claim 1 wherein said alarm means includes a timer, and said means for resetting said alarm indication is a pulse generator, coupled tos aid timer, which produces a pulse during an operation of said timer, said pulse resetting said alarm means.

4. An alarm as in claim 3 wherein said alarm means includes a flip flop, and said pulse generator provides a pulse, which while active provides a reset to said flip flop, and which when completed, ends said reset to allow said alarm to recur, said alarm means producing said alarm indication by latching into an active state only when said reset is removed and said more than a predetermined current is drawn from said battery.

5. A burglar alarm as in claim 3 further comprising an OR gate, one input of which receives an output from said arming means and another input of which receives an output from said pulse generator, an output of said OR gate being coupled to a reset input of said alarm means.

6. A burglar alarm for an automotive vehicle having an electrical system including a battery, battery cables, at least one electrical device for drawing current from the battery, and a switch for controlling current flow from the battery to said device, said burglar alarm comprising:
   input means for sensing an amount of current drawn from said battery by said at least one device and producing a signal indicative thereof;
   arming means responsive to said signal for automatically arming said burglar alarm only when less than a predetermined current is drawn from said battery;
   alarm means for producing an alarm indication for a predetermined time when said alarm is armed and more than a predetermined amount of current is drawn from said battery; and
   means for ending said alarm indication after said predetermined time and allowing said alarm indication to recur if said alarm means still receives more than a predetermined current drawn from said battery.

7. An alarm as in claim 6, wherein said alarm recurs if said alarm means subsequently receives more than a predetermined amount of current drawn from said battery.

8. An alarm as in claim 7 wherein said arming means is a timer which produces an output after a predetermined amount of time of discharge from said battery of less than said predetermined current, and said alarm means is a flip flop which receives said signal to signal an end of a reset.

9. A burglar alarm as in claim 8 wherein said arming means also includes means for resetting said flip flop when said alarm indication is produced.

10. A burglar alarm for an automotive vehicle having an electrical system including a battery, battery cables, at least one electrical device for drawing current from the battery, a switch for controlling current flow from the battery to said device; and a charging means for supplying charging current to the battery, said burglar alarm comprising:
    input means for sensing an amount of current provided to said battery by said charging means and providing a signal indicative thereof;
    arming means for arming said burglar alarm responsive to an arming stimulus;
    alarm means for producing an alarm indication for a predetermined time when said alarm is armed and more than a predetermined amount of current is drawn from said battery;
    a disarming means responsive to said signal for automatically disarming said alarm, and resetting said arming means thereby ending said alarm indication when more than a predetermined current is charged to said battery; and
    means for resetting said burglar alarm a predetermined time after said indication, so that said burglar alarm remains armed after said predetermined time only if said current is less than said predetermined amount, and said alarm indication continues to be produced if more than a predetermined current continues to be drawn from said battery.

11. A burglar alarm as in claim 10 wherein said alarm means is a flip-flop, and said arming means releases a reset signal to said flip-flop to arm said burglar alarm responsive to said arming stimulus, said resetting means produces said reset signal to reset said burglar alarm.

12. A method of operating a burglar alarm for an automotive vehicle, comprising the steps of:
    sensing an amount of current provided to a battery of the vehicle;
    automatically arming said burglar alarm only when said current changes from more than a predetermined amount to less than said predetermined amount;
    producing an alarm indication when said burglar alarm is armed and more than a predetermined current is drawn from said battery;
    resetting said arming means at a time during said alarm indication; and
    said alarm indication recurring after a predetermined time if said burglar alarm is armed and more than a predetermined current continues to be drawn from said battery, and producing another alarm indication when said burglar alarm is armed and more than a predetermined current is again drawn from said battery.

* * * * *